July 24, 1951  C. V. GUTENSOHN  2,562,032
SCREW AND BOLT LOCK
Filed Nov. 7, 1945  2 Sheets-Sheet 1
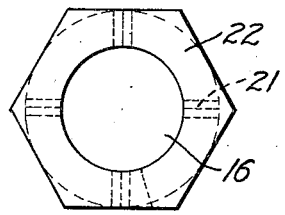
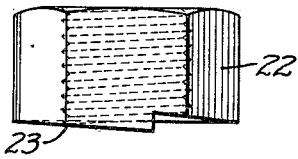
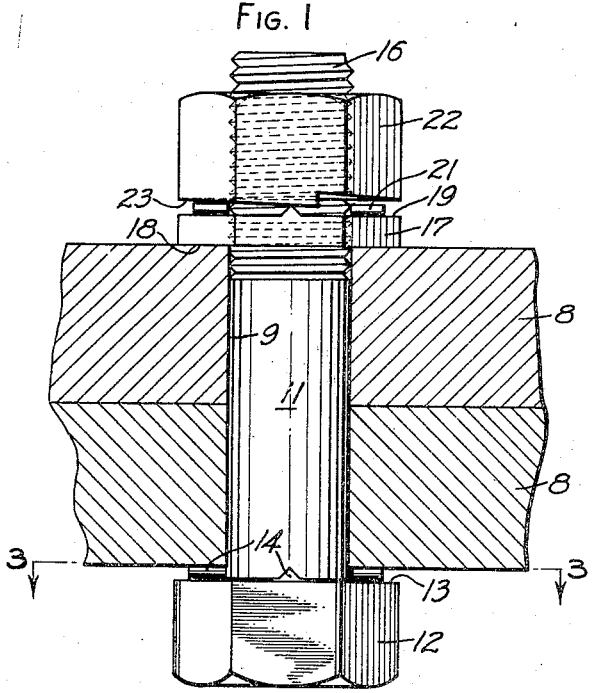
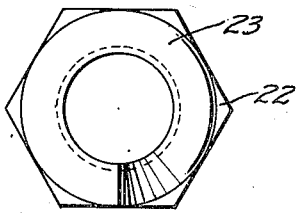
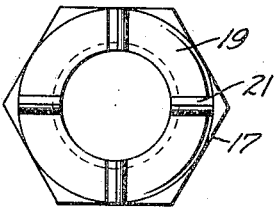
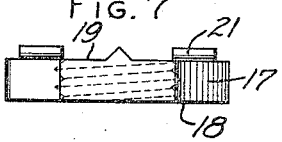
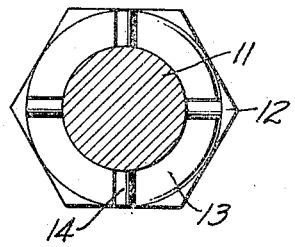
INVENTOR.
CHARLES V. GUTENSOHN
BY July 24, 1951  C. V. GUTENSOHN  2,562,032
SCREW AND BOLT LOCK
Filed Nov. 7, 1945  2 Sheets-Sheet 2
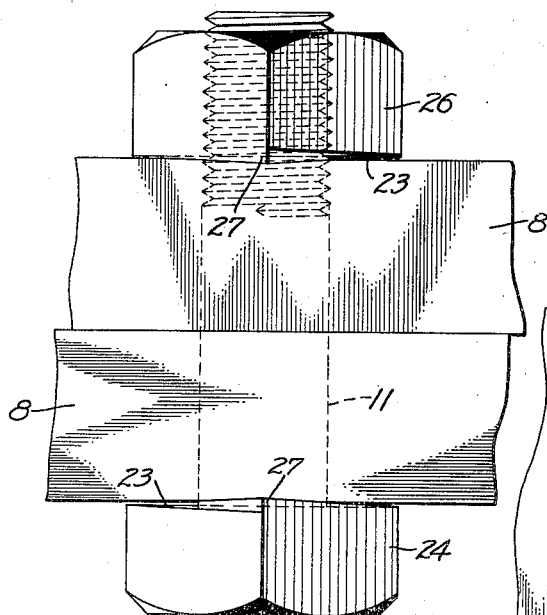
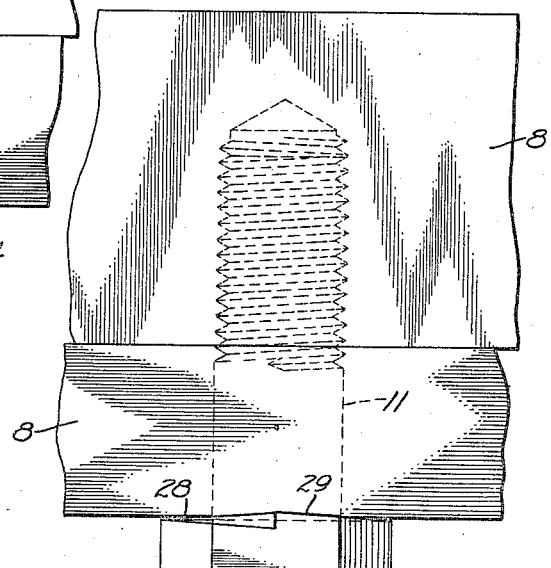
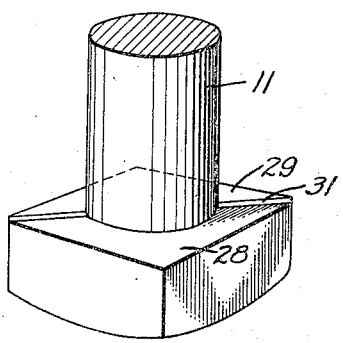
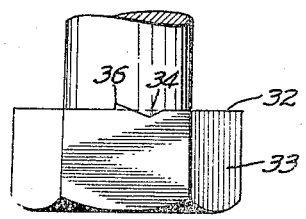
INVENTOR.
CHARLES V. GUTENSOHN
BY Gardner & Warren
his atty.

Patented July 24, 1951

2,562,032

UNITED STATES PATENT OFFICE 2,562,032

SCREW AND BOLT LOCK

Charles V. Gutensohn, San Francisco, Calif., assignor of one-half to C. Dudley De Velbiss Application November 7, 1945, Serial No. 627,187

1 Claim. (Cl. 151—20)

This invention relates to means for preventing the loosening of screws or bolts, relative to the structures with which they are associated, during the periods in which the former are employed to clamp or secure members of the structures together.

An object of the invention is to provide a locking screw or bolt and nut combination in which, during normal use and under normal conditions, the component parts of the combination; that is, the bolt or screw nut and the parts held together thereby, are secured in relatively immovable relationship.

Another object of the invention is to provide a locking screw or bolt and nut combination which utilizes substantially standard parts incorporating only minor design changes.

A further object of the invention is to provide apparatus of the character described which, although tenaciously holding to set positions against abnormal strains tending to effect relative loosening of the parts, may be readily deliberately released.

Still another object of the invention is to provide a locking screw or bolt and nut combination which may be repeatedly tightened and released without creating any serious damage in the component parts of the combination.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim.

Referring to said drawings:

Figure 1 is a view of one form of the invention in side elevation, showing a complete locknut and bolt combination.

Figure 2 is a top plan view of the bolt and nut structure shown in Figure 1.

Figure 3 is a horizontal sectional view taken in the plane indicated by the line 3—3 of Figure 1.

Figure 4 is a side elevational view of the main nut.

Figure 5 is a bottom plan view of the nut shown in Figure 4.

Figure 6 is a top plan view of the jamb nut.

Figure 7 is a side elevational view of the nut in Figure 6.

Figure 8 is a side elevational view of a bolt and nut structure embodying another form of the invention.

Figure 9 is a fragmental perspective view showing the lower end of the bolt and its head.

Figure 10 is side elevational view of a capscrew embodying my invention showing the application of the screw to structural elements.

Figure 11 is a fragmental side elevational view of a bolt head showing a further modified form of locking tooth.

In the modification of Figure 1, I have shown a pair of contiguously related structural members 8 which are to be joined together and which are provided with axially aligned bolt holes 9. Extending through the registered bolt holes I provide a bolt 11 having an abutment member or head 12 on the face 13 of which is formed a plurality of teeth 14 extending toward and contacting the adjacent surface of one of the structural members 8. The teeth, in this instance, are shown as being triangular in cross-section, but other tooth forms may be employed as will be described later. The upper end of the bolt is provided with a threaded extension 16 with which is threadedly engaged a jamb nut 17 having a lower plane surface 18 engageable with the upper surface of the second structural member 8 and having on its upper surface 19 a plurality of teeth 21 similar to the teeth 14 of the bolt head. Also threadedly engaged with the threaded extension 16 of the bolt and overlying the jamb nut 17 is a main nut 22 having its lower surface 23 confronting the jamb nut formed in this case, as a complete cycle helix progressing axially of the nut and adapted to be brought into contact with one of the jamb nut teeth 21.

In use, the bolt is assembled as shown in the drawing and sufficient torque is applied to the jamb nut 17, by means of a wrench, to produce the desired squeezing force on the structural members 8, and to cause the teeth 14 of the bolt head to partially embed themselves in the surface of the adjacent member 8. The main nut is then run down until it engages the jamb nut whereupon the wrench is applied to the main nut and the latter is cinched up tight. It will be noted that at all times only one of the jamb nut teeth 21 engages the helical face 23 of the main nut. Thus, when the main nut is cinched down, this single tooth contact will cause a tilting of the main nut transversely of the axis of the bolt which will produce a frictional cramping of the relative screw threads of the bolt and nut in addition to the frictional pressure imposed between the threads axially of the bolt by the act of jamming the main nut against the jamb nut. The aforementioned tilting stress imposed on the bolt is not of sufficient severity as to cause dangerous structural strain in the bolt or the bending of its fibers beyond their elastic limit since the lead of the helix forming the nut face 23 is not sufficiently great to cause these conditions. Furthermore, in cinching down the main nut, the engaging tooth 21, as the main nut reaches its limit of rotation under the torque of the wrench, will become partially embedded in the surface 23 and will thereafter securely lock the main and jamb nuts together against relative displacement. When both nuts are cinched up tight, it will be seen that all parts of the bolt and nut combination are locked together and may not be moved rotatably, unless this is deliberately done by the application of counter wrench torque, relative to each other or to the structural members. It will also be seen that the parts are readily separable by wrench pressure without causing any serious deformity or damage thereto and that, other than the jamb nut, no parts departing widely from standard practice or introducing complicated manufacturing method are used.

In Figures 8 and 10 I have illustrated a modified form of the invention. It will be noted in this instance that the jamb nut is dispensed with, which is permissible in installations wherein vibration is not excessive, so that the teeth 27 of the bolt head and nut 24 and 26, respectively, each directly engage the confronting surfaces of the members 8. In addition to the tilting action hereinbefore described, the lock between the parts is effected by the teeth 27 more or less readily sliding over the surfaces of the members 8, when the bolt head 24 or the nut 26 are rotated in a clockwise direction to effect a tensioning of the bolt, and digging into the surface when the counter-clockwise rotation of the element is attempted.

Figure 9 shows a further modified form of the invention wherein the abutting face of the bolt head or nut, as the case may be, is composed of a pair of surfaces 28 and 29 which are relatively offset, axially of the screw member 11, to form a pair of diametrically opposed ledges 31 which thus provide teeth equivalent to the teeth 27. The surface 28 normally intersects the axis of the screw member while the surface 29 is inclined with respect thereto and recedes from the upper edge of the ledge 31, as viewed in the drawing, to substantially the level of the surface 28 at the rearmost corner of the bolt head or nut. The effect of this structure is to provide a certain amount of gauging of the teeth into the elements 8 regardless of which direction the loosening force imposed on the screw member may be directed in. The lock form just described also adapts itself to right or left-hand threaded bolts or screws.

In Figure 11 I have shown a locking tooth which may be formed on existing standard bolt heads or nuts so as to render the latter usable in carrying out the principles of my invention. In this instance the abutting face 32 of the bolt head or nut 33 is subjected to a cold forging operation wherein a suitably formed tool is impinged against the face with sufficient force as to create an indentation 34 and to cause a displacement of the metal formerly contained therein to one side or the other of the indentation so as to form the tooth 36. The locking action of this type of tooth is very similar to that previously described in connection with the tooth 27.

I claim:

A lock structure comprising a bolt having a head at one end thereof, a jamb nut threadedly engaged with another end thereof, and head and jamb nut having relatively confronting surfaces between which an element may be engaged, said jamb nut on the face thereof remote from its confronting surface having a plurality of V-shaped teeth projecting therefrom with the apex of each tooth lying substantially coplanar with its adjacent tooth in a plane substantially normal to the axis of said bolt, a main nut threadedly engaged with said bolt and having a transaxial surface formed as a revolutional helix extended axially of the bolt and engageable with only one of said teeth, said main nut being urged toward a position axially angularly related with the bolt axis when tightened against said jamb nut forcibly and frictionally engaging said helix with said tooth for securing said elements against ready relative rotation but permitting deliberate release and separation thereof.

CHARLES V. GUTENSOHN.

REFERENCES CITED

The following references are of record in the file of this patent:

UNITED STATES PATENTS

| Number | Name | Date |
| --- | --- | --- |
| 679,618 | Hanson | July 30, 1901 |
| 723,419 | Stinson | Mar. 24, 1903 |
| 735,336 | Bowles | Aug. 4, 1903 |
| 1,180,561 | Bateman | Apr. 25, 1916 |
| 1,213,071 | Buckner | Jan. 16, 1917 |
| 1,347,124 | Schrader | July 20, 1920 |
| 1,551,389 | Hanson | Aug. 25, 1925 |

FOREIGN PATENTS

| Number | Country | Date |
| --- | --- | --- |
| 797 | Great Britain | 1911 |
| 194,377 | Great Britain | Mar. 7, 1923 |
| 477,143 | Great Britain | Dec. 22, 1937 |